United States Patent

Wavre

[11] Patent Number: 5,910,691
[45] Date of Patent: Jun. 8, 1999

[54] PERMANENT-MAGNET LINEAR SYNCHRONOUS MOTOR

[76] Inventor: Nicolas Wavre, Crêt-Taconnet 40, CH-2000, Neuchâtel, Switzerland

[21] Appl. No.: 08/813,152

[22] Filed: Mar. 7, 1997

Related U.S. Application Data

[63] Continuation-in-part of application No. 08/406,599, Mar. 20, 1995, Pat. No. 5,642,013.

[51] Int. Cl.$^6$ .................................................. H02K 41/00
[52] U.S. Cl. .................................. 310/12; 310/54; 310/58; 310/156; 310/254
[58] Field of Search .................................. 310/12, 54, 58, 310/254, 156, 4

[56] References Cited

U.S. PATENT DOCUMENTS

| | | | |
|---|---|---|---|
| 2,092,058 | 9/1937 | Ferris | 310/254 |
| 2,169,100 | 8/1939 | Lange | 310/254 |
| 4,260,926 | 4/1981 | Jarrett et al. | 310/254 |
| 4,424,463 | 1/1984 | Musil | 310/49 R |
| 4,554,491 | 11/1985 | Plunkett | 318/254 |
| 4,581,553 | 4/1986 | Moczala | 310/12 |
| 4,638,192 | 1/1987 | Von Der Heide | 310/12 |
| 4,705,971 | 11/1987 | Nagasaka | 310/254 |
| 4,725,750 | 2/1988 | Welch | 310/254 |
| 4,757,220 | 7/1988 | Pouillange | 310/49 R |
| 4,766,358 | 8/1988 | Higuchi | 318/135 |
| 4,862,024 | 8/1989 | Stingle et al. | 310/64 |
| 4,868,431 | 9/1989 | Karita et al. | 310/12 |
| 4,912,746 | 3/1990 | Oishi | 310/12 |
| 4,922,165 | 5/1990 | Crawford et al. | 310/215 |
| 5,013,223 | 5/1991 | Takahashi et al. | 417/413 |
| 5,093,543 | 3/1992 | Patton et al. | 310/215 |
| 5,198,711 | 3/1993 | Eckersley | 310/12 |

FOREIGN PATENT DOCUMENTS

| | | | |
|---|---|---|---|
| 2 678 448 | 12/1992 | France | 310/12 |
| 249 091 | 7/1912 | Germany | 310/12 |
| 35 40 349 | 8/1986 | Germany | 310/12 |
| 90 09698 | 8/1990 | WIPO | 310/12 |

OTHER PUBLICATIONS

IEEE 1993, 28th.IAS Annual Meeting, Oct. 3, 1993, "A High Force Density Linear Switched Reluctance Machine", pp. 251–257.
Conference Record of the Industry Applications Society Annual Meeting, Oct. 1–5, 1989, "Optimum Tooth Design for Linear Pulse Motor", pp. 272–277.

*Primary Examiner*—Elvin G. Enad
*Attorney, Agent, or Firm*—Pollock, Vande Sande & Amernick, R.L.L.P

[57] ABSTRACT

A synchronous permanent magnet linear motor (8) comprising an armature (76) formed by: —a pack of ferromagnetic laminations forming a yoke (1) and a plurality of teeth (25) situated between two end teeth (78 and 80); —a plurality of coils disposed in said slots so that each of them surrounds at least one of said teeth (25); —an inductor (61) disposed facing the armature and comprising a plurality of permanent magnets (8) arranged in a regular manner with a pole pitch τp and defining a general plane (82). The end teeth (78 and 80) are also formed by said pack of ferromagnetic laminations and they have a profile formed of a first segment (84) defining a substantially constant air-gap with the general plane (82) and a second segment (86) defining an air-gap which increases in the direction moving away from the central part (90) of the armature. The laminations of said pack of laminations have essentially identical profiles.

12 Claims, 11 Drawing Sheets

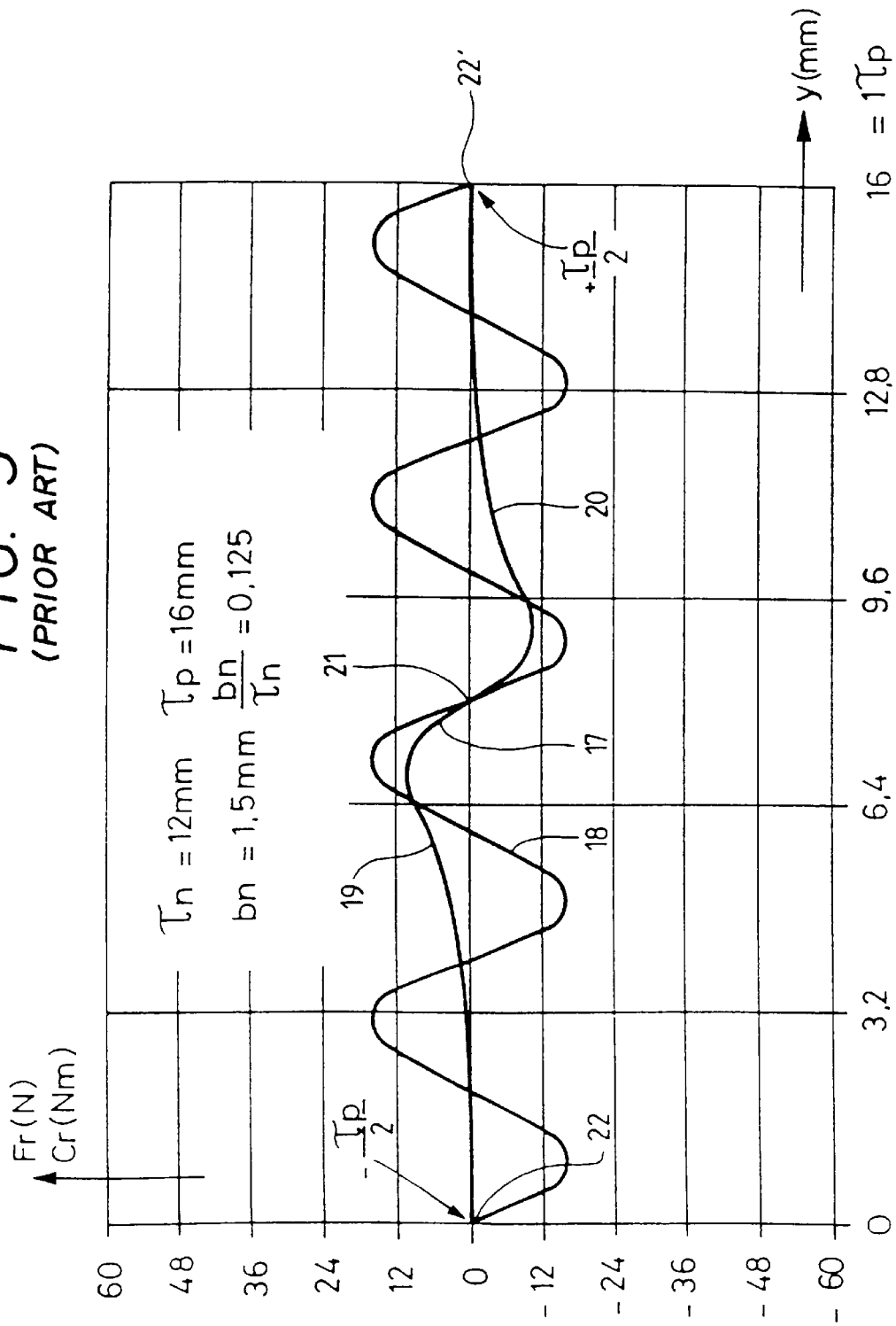

FIG. 4
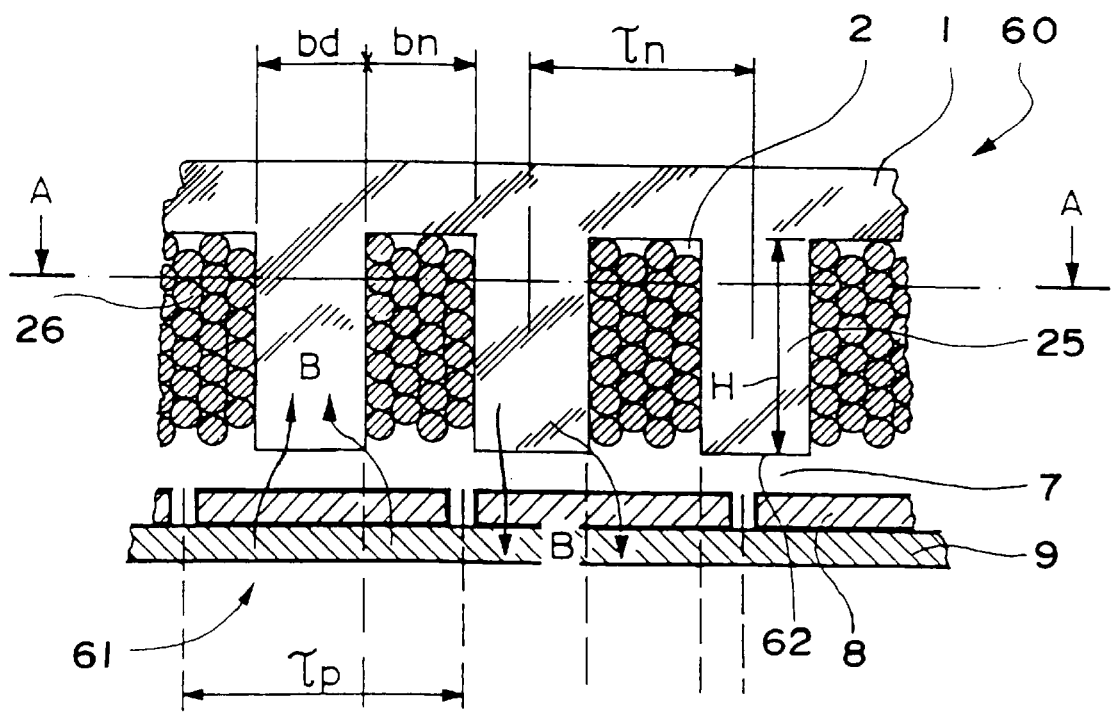
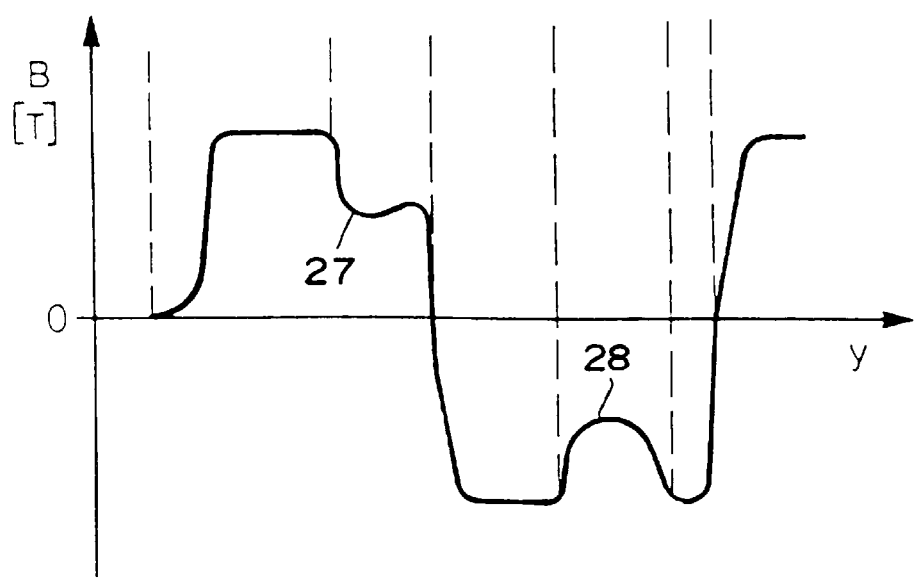
FIG. 5

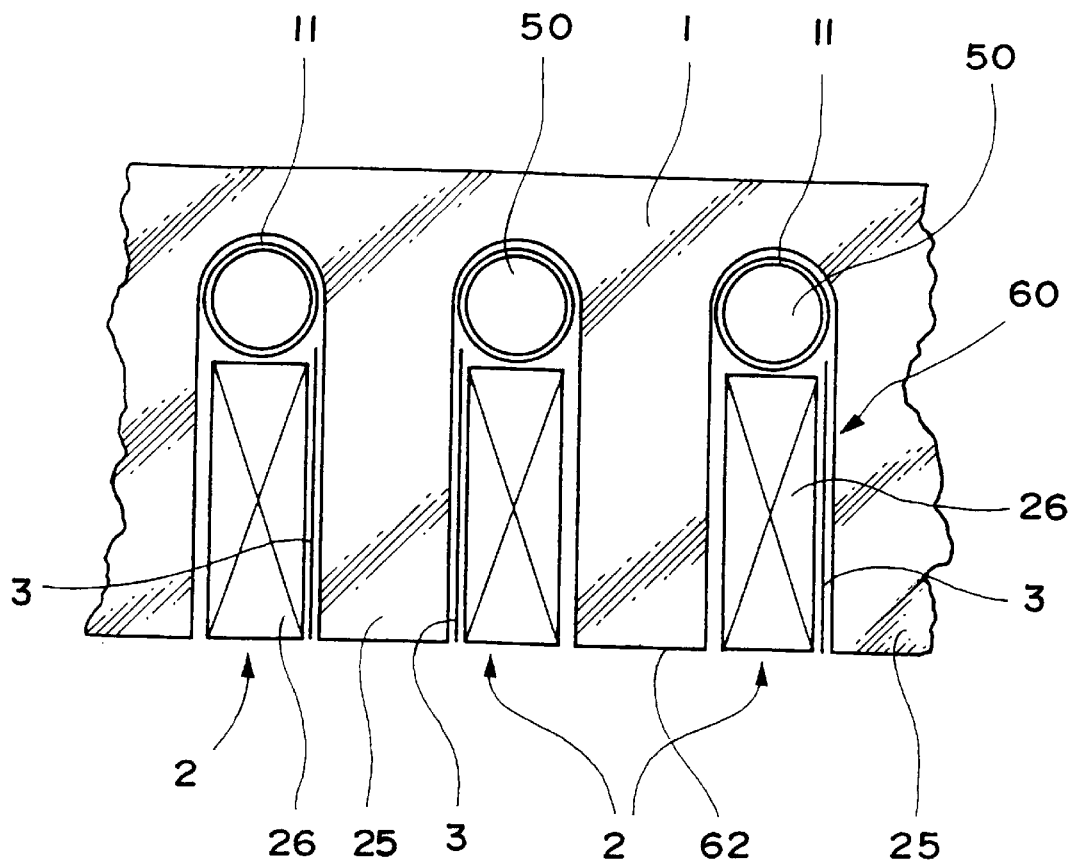
FIG. 10
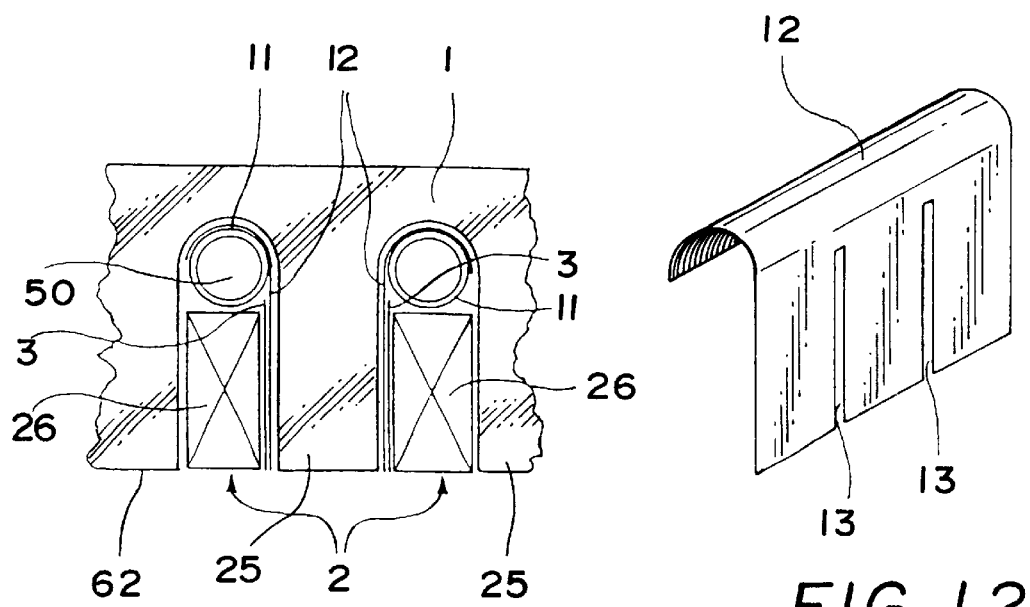
FIG. 11
FIG. 12

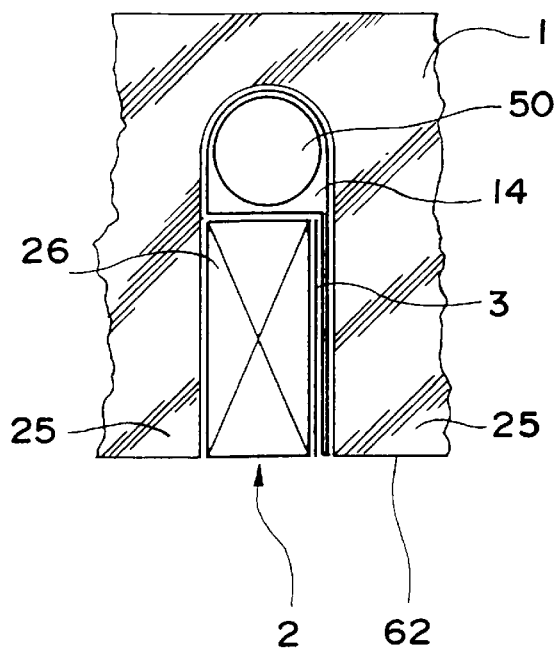
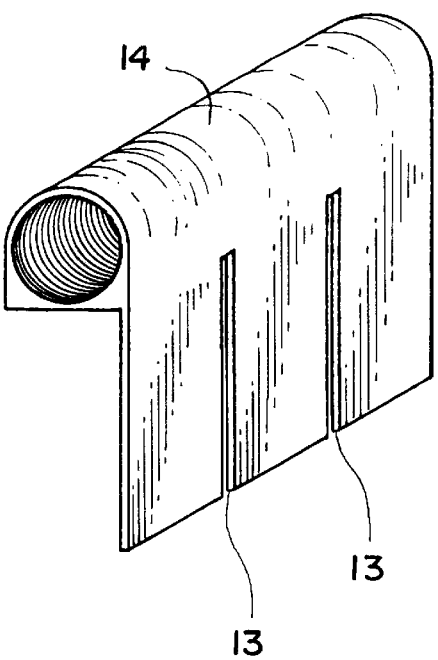
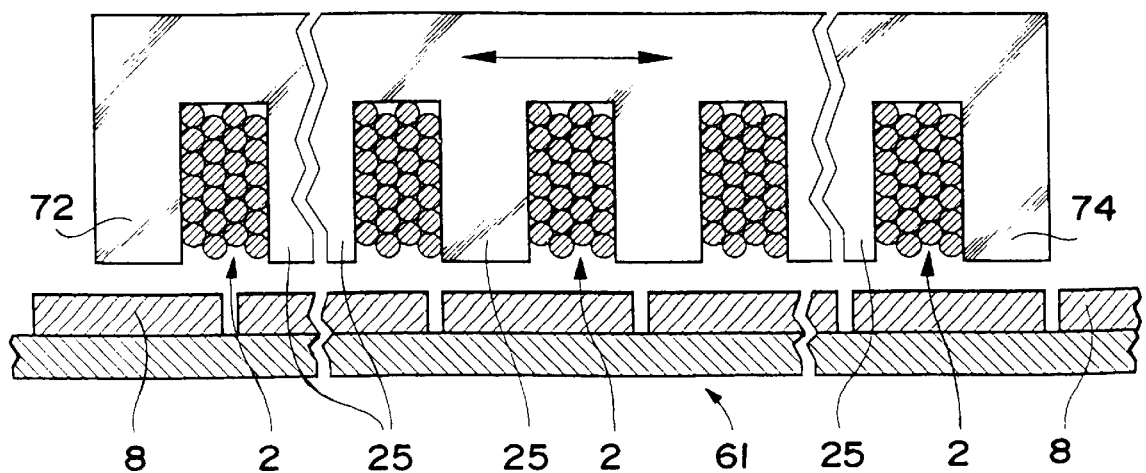

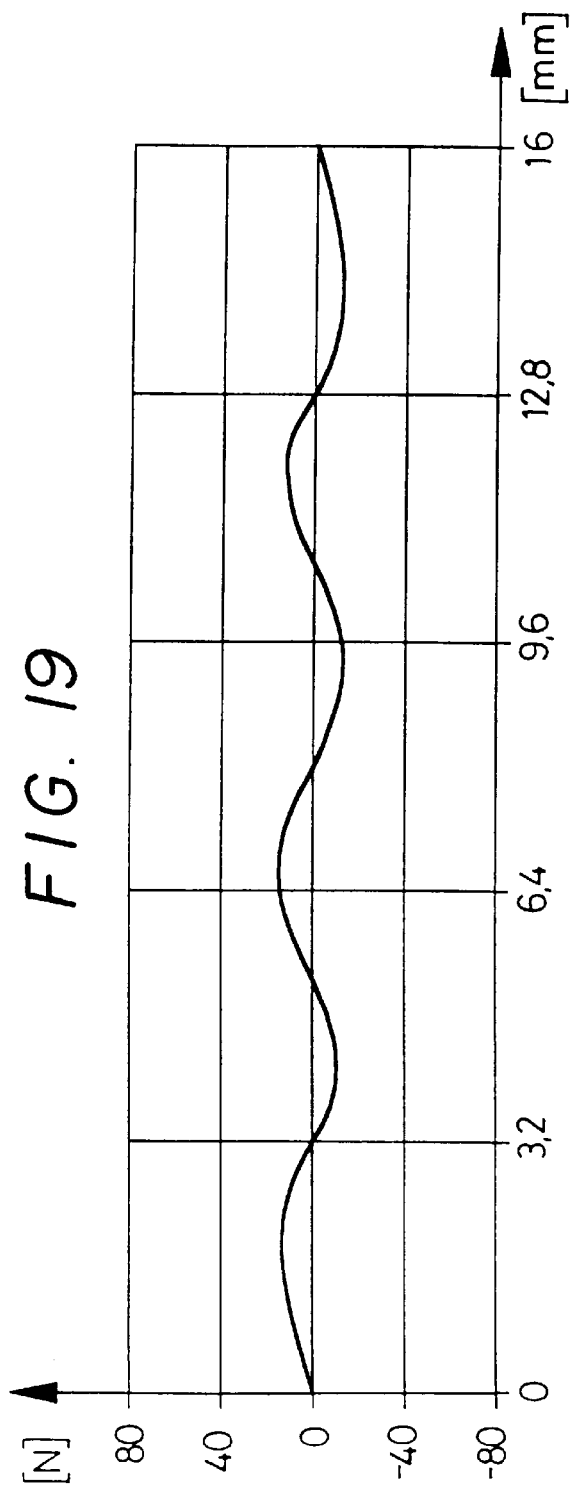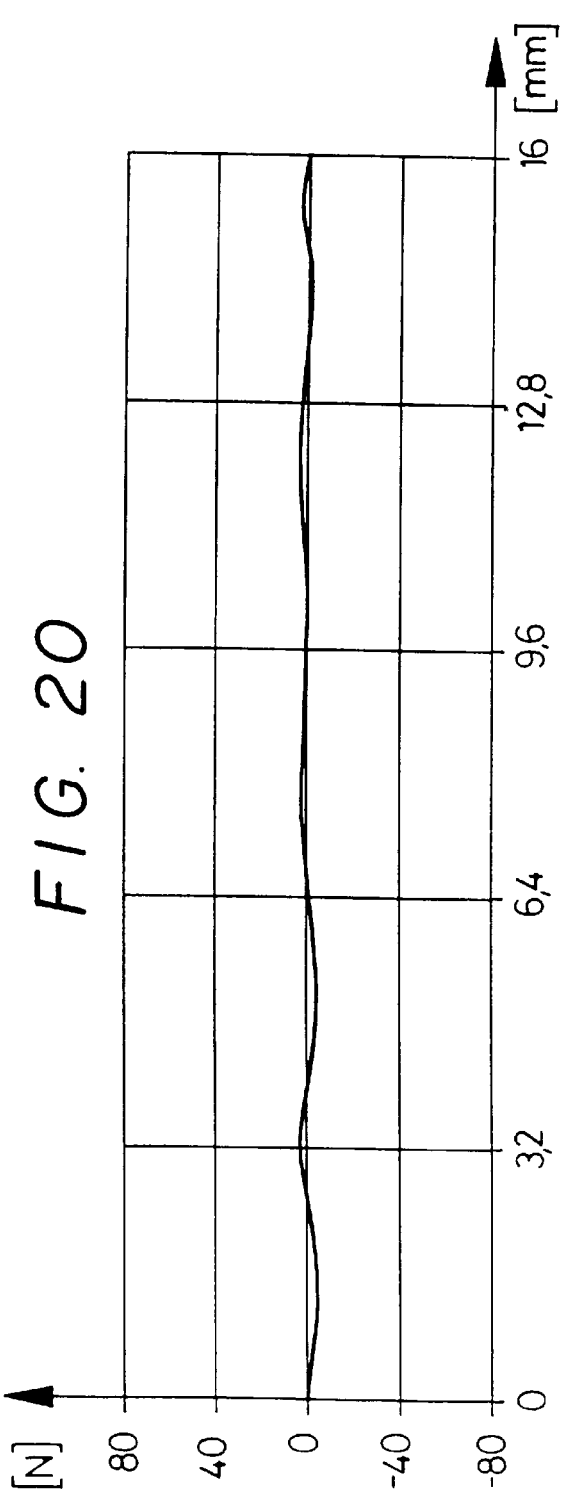

PERMANENT-MAGNET LINEAR SYNCHRONOUS MOTOR

RELATED APPLICATIONS

This application is a continuation-in-part of U.S. patent application Ser. No. 08/406,599, filed Mar. 20, 1995, now U.S. Pat. No. 5,642,013 the entire contents of said prior application being expressly incorporated by reference into the present application.

BACKGROUND OF THE INVENTION

This invention relates to a linear synchronous motor including an armature comprising a yoke, a plurality of teeth and two end teeth all being solid with said yoke and defining therebetween slots, and coils at least partly disposed in these slots and each surrounding at least one tooth of said plurality of teeth, these latter teeth each having a free end forming a tooth head having a first width. Said slots each have a second width at the level of said tooth heads, said motor further includes an inductor disposed in facing relationship with said tooth heads and comprising a plurality of permanent magnets and a flux-returning sole on which said permanent magnets are disposed.

A linear synchronous motor corresponding to the above generic definition is known. It is illustrated in this document by FIGS. 1, 1a, 2 and 3 which set forth the state of the prior art.

FIG. 1 is a partial section in a linear synchronous motor constructed according to the prior art. Here, the armature 60 is a stator that consists of a pack of ferromagnetic laminations and in which the yoke 1 and teeth 10 may be seen, the teeth 10 being regularly arranged with a tooth pitch τn. The armature 60 further comprises a plurality of slots 2 separating the teeth 10 and in which are housed coil windings 4, the latter being insulated from the yoke 1 and from the teeth 10 by insulating sheets 3. In this type of motor, one skilled in the art arranges the heads of teeth 10 so that they are terminated by a broadened portion or shoe 10' whose purpose is to create an opening or pre-slot 6 of reduced width for reasons that will become apparent below. The windings 4 are generally loosely coiled, in no precise order either with a spooling machine or inserted by hand into the slots 2 through the pre-slots 6. To keep the winding in slot 2, a sliding closer 5 is provided that bears on the shoes 10'.

FIG. 1 also shows the motor's inductor 61 which in the present example is the movable part of the motor that travels linearly along the axis y. Inductor 61 essentially comprises a plurality of permanent magnets 8 in the shape of rectangular parallelepipeds that are regularly disposed, with a pole pitch τp, on a plane flux-returning sole 9 made of ferromagnetic material. The armature 60 and inductor 61 are reparated by an air-gap 7.

FIG. 2 shows the distribution of the normal component of the magnetic induction B expressed in Tesla (T) and which extends here over two pole pitches τp. It should be noted that induction B is that which is produced solely by the magnets 8 of inductor 61 on the teeth 10 of armature 60. It will be seen in FIG. 2 that the openings 6 of slots 2 cause disturbances 15 and 16 that are clearly visible in the outline of induction B. These openings, of width bn, are responsible for a phenomenon that is well known in permanent-magnet motors called the reluctant effect. This effect creates a parasitic force, or reluctant force Fr, which is directed along axis y and which disturbs the motor's proper operation. The variations of this force Fr is represented in the graph of FIG. 3.

The graph of FIG. 3 is based on a motor having a tooth pitch τn of 12 mm, a pole pitch τp of 16 mm and a slot opening bn of 1.5 mm, the ratio bn/τn thus having a value of 0.125. The pole pitch τp is shown along the abscissa and the reluctant force Fr along the ordinate. τp is expressed in millimeters (mm) and Fr in Newtons (N). The curve 17 of the FIG. 3 graph reflects the outline of the reluctant force Fr that would be produced if the armature only had one slot. This curve is characterized by two unstable points 22 and 22' of low steepness and by a stable point 21 of high steepness. At points 22 and 22' slot 6 is in the middle of a magnet 8 (−τp/2 and +τp/2), whereas at point 21, it is between two magnets 8. If the inductor 61 is for instance located between 0 and 3.2, it will move to the right in supplying a driving force (slope 19) and stabilize itself at point 21. But if the inductor 61 is located between 16 and 12.8, it will move to the same point 21 in supplying a braking force (slope 20). The curve 18 of the FIG. 3 graph reflects the outline of the total reluctant force Fr that is produced over one pole step τp, the armature 60 having eight slots. The parasitic reluctant force then has a succession of eight parasitic maxima that disturb the proper operation of the motor, these forces being of the order of 16 Newtons. It will thus be appreciated that if no due care is given to this phenomenon, the motor may become unusable, as the reluctant force can then exceed the maximum force that can be provided by the motor when supplied with current.

To eliminate or greatly reduce this reluctant effect, one widespread technique consists in staggering the laminations forming the armature 60 in relation to one another so that in a section such as that represented in FIG. 1a, the longitudinal axes of the teeth 10 and of the slots 2, shown in chain-dotted lines, form an angle other than 90° with the direction of motion y of inductor 61, not shown in FIG. 1a, in relation to armature 60. It should be noted that, in FIG. 1a, which is a section along axis A—A of FIG. 1, the windings 4 and the insulating sheets 3 disposed in the slots 2 have not been shown, and that the laminations forming the armature 60 have not been illustrated separately.

This technique of staggering the laminations forming armature 60 gives rise to additional difficulties by complicating the tooling required for manufacturing purposes and by making it more difficult to insert the windings 4 into the slots 2.

Another technique, which may be combined with the previous one, consists in disposing the magnets 8 obliquely, i.e. in a manner such that the arises thereof lying parallel to the plane of sole 9 respectively form angles other than 0° and 90° with the direction of motion y of inductor 61 in relation to armature 60. This technique also complicates the manufacture of the motors.

In any case, besides the above-mentioned arrangements for reducing the reluctant effect, it will always be endeavoured to provide the pre-slots 6 with a width bn that is as small as possible, thereby complicating the spooling operations since, because of the very small slot width bn, the coils, before being fitted, must be arranged loosely to enable them to be inserted into the slot 2 through the pre-slot 6. This looseness for packing purposes means that the wires forming windings 4 are very irregularly arranged in slots 2. Consequently, the space filling coefficient of slots 2 is low (of the order of 30%) and the thermal resistance between the windings and the yoke 1 is large. These drawbacks respectively lead to low motor efficiency and to poor thermal capacity.

In addition to the parasitic reluctant force from the slots 2, a parasitic reluctant force is generated by the two end teeth of the armature of the linear motor. Such parasitic reluctant force from the end teeth arises from the air-gap variation between the end teeth and the external peripheral regions. In the absence of superposition with the armature, the air-gap for a magnet is quasi-infinite, while such air-gap has a determined finite value when an end tooth of the armature is superposed onto such magnet. There is thus a large air-gap variation at the armature ends which corresponds, when the armature is in movement, to a relatively significant variation in magnetic energy. Such variation in magnetic energy generates a reluctant force which acts on the armature. Such reluctant force varies for each of the end teeth as a function of the position of the end tooth with regard to the permanent magnets of the inductor. This reluctant force is in fact different according, in particular, to whether the end tooth is situated between two adjacent permanent magnets or substantially in the middle of one of the magnets. This variation in the reluctant force during movement of the armature impairs the proper functioning of the linear motor.

In order to obviate the aforementioned problem, the man skilled in the art has provided various arrangements. However, the arrangements known to the man skilled in the art have various drawbacks and generally increase the manufacturing cost of the linear motor, either because of relatively complex additional machining steps, or because of the addition of additional ferromagnetic parts arranged at both ends of the armature.

Examples of machining of packs of laminations at the level of the two end teeth are in particular disclosed in U.S. Pat. No. 4,912,746 wherein the end teeth, and in certain alternative embodiments also the teeth situated upstream of such end teeth, are machined after assembly of the packs of laminations, to reduce the end reluctant effect. If the man skilled in the art wishes to avoid end machining of the end teeth in the case of the embodiments disclosed in patent document U.S. Pat. No. 4,912,746, he must machine laminations having different profiles and then assemble them so as to form the armature described in particular in FIGS. 1 and 2 of such document. The version requiring final machining of the assembled lamination pack is more particularly shown in FIG. 6 of such document. Moreover, the reduction of the end reluctant effect is not reduced in a completely satisfactory manner in the case of such embodiments.

U.S. Pat. No. 4,638,192 discloses a linear motor wherein an additional metal sheet part is provided which envelops the armature and defines two end parts intended to reduce the end reluctant effect (see FIGS. 4, 6 and 7). The addition of an additional part enveloping the armature increases the manufacturing cost of the motor. Also, such an additional part is subjected to magnetic forces and undergoes vibrations and deformations which adversely affect the correct functioning of such a motor. Indeed, the vibrations reduce the working efficiency and precision of such a motor. The embodiment proposed in U.S. Pat. No. 4,638,192 has been shown to be disadvantageous in operation and not at all suited to linear motors of large size given that the additional metal sheet part is rapidly magnetically saturated.

SUMMARY OF THE INVENTION

In order to overcome the aforementioned drawbacks with regard to the parasitic reluctant effect at the two ends of the mobile part of the linear motor, the invention provides that the two end teeth of the armature are also formed by the pack of ferromagnetic laminations assembled to form such armature and that these two end teeth have a profile, in a longitudinal cross-section plane of said armature which is perpendicular to the general plane defined by the plurality of permanent magnets of the inductor, formed of a first part defining a substantially constant air-gap with said general plane and a second part defining an air-gap which increases in the direction moving away from the central part of said armature. The laminations of the pack of laminations forming the armature all have a substantially identical profile to each other.

According to a particular embodiment of the invention, the first part is a longitudinal line segment, i.e. parallel to the direction of movement of the armature, and the second part is a sloping line segment with respect to the first part and forms a sloping edge between the first segment and the frontal, respectively back face of the armature.

However, in other embodiments of the invention, the second part is formed of a curved segment.

In order to obtain a significant reduction of the reluctant force variation within the framework of linear motors according to the invention, the first part preferably has a length comprised within the range of 0.3 and 0.5 times the pole pitch τp defined by the arrangement of the permanent magnets of the inductor. In this preferred alternative embodiment, the second part has a length, when projected onto said general plane, comprised within the range of 0.2 and 0.45 times the pole pitch τp.

As a result of these characteristics, and as will be described in greater details further on, the overall reluctant force that subsists in a motor according to the present invention is much smaller than that existing in a prior art motor. Further, the manufacture of a motor according to the present invention is much simpler, and hence cheaper, than that of a prior art motor.

Other characteristics and advantages of the present invention will become apparent on reading the description made hereafter with reference to the accompanying drawings, given solely by way of example.

DESCRIPTION OF THE FIGURES

FIG. 3 is a graph representing the reluctant force produced, on the one hand, by a single slot in the FIG. 1 motor, and, on the other hand, by eight slots of the same motor;

FIG. 4 is a partial section of a linear synchronous motor according to the invention and according to a first constructional form thereof;

FIG. 5 shows the outline of the magnetic induction B of the FIG. 4 motor;

FIG. 10 is a partial section in the armature of a synchronous motor according to the invention and in accordance with a second constructional form thereof;

FIGS. 11 and 12 show a third constructional form of the motor according to the invention, the first in section, the second in perspective;

FIGS. 13 and 14 show a fourth constructional form of the motor according to the invention;

FIG. 15 shows a linear motor having slots arranged according to the concept of the present invention, but having two end teeth similar to the plurality of teeth arranged between said two end teeth, this embodiment being given for the purposes of explaining the very advantageous effects of the present invention as regards the two end teeth;

FIG. 19 is a similar figure to FIG. 16 in the case of the motor shown in FIGS. 17 and 18, wherein the two end teeth are of optimum dimensions; and FIG. 20 is a similar figure to FIG. 19, but showing the total reluctant effect of a linear motor according to the invention for which the residual reluctant effect due to the slots and the residual reluctant effect due to the two end teeth are phase shifted so as partially to compensate each other to obtain a minimum total reluctant effect.

DESCRIPTION OF THE PREFERRED EMBODIMENT

A first embodiment of a permanent-magnet synchronous linear motor will be described hereinafter.

Figure 8:
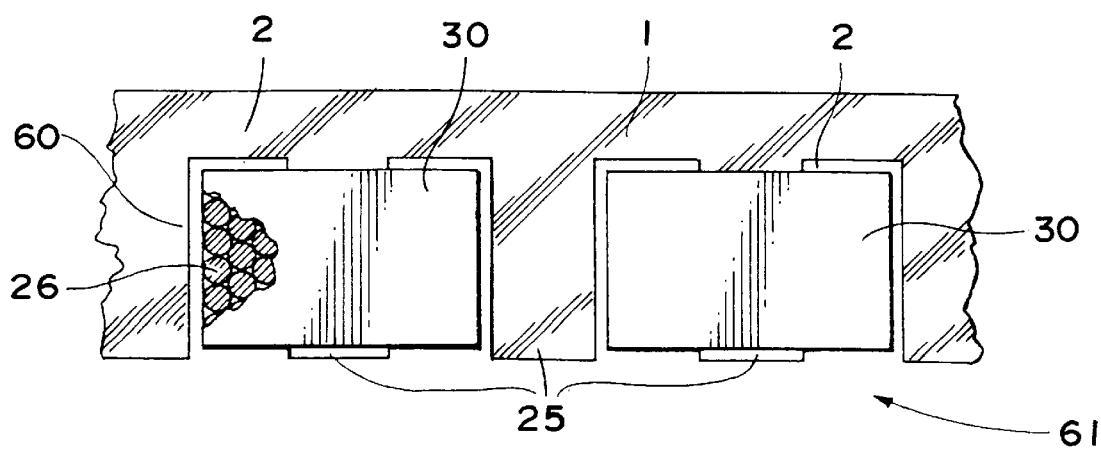
FIGS. 8 and 9 show two ways of spooling a synchronous motor according to the invention.

FIG. 4 is a partial section in a linear synchronous motor made in accordance with the invention and according to a first constructional form. Like the prior art motor, described with reference to FIG. 1, this motor comprises an armature 60 that is made up of a pack of laminations and which includes a yoke 1 and a plurality of teeth 25 having a first end solid with the yoke 1 and a second end, opposite to the first and forming a tooth head 62. The teeth 25 are regularly disposed with a tooth pitch $\tau n$. Each tooth 25 is separated from the next by a slot 2 in which is housed for instance the winding 26 of a coil such as those that are shown in FIG. 8 and referenced 30. The height of the teeth 25, i.e. the distance separating their first end from their second end, is referenced H.

The motor also comprises an inductor 61 disposed opposite the tooth heads 62. The inductor 61 is fitted with a plurality of permanent magnets 8 in the form of rectangular parallelepipeds that are regularly disposed, with a polar pitch $\tau p$, on a flat flux-returning sole 9 made of a ferromagnetic material. The inductor 61 and the armature 60 are separated by an air-gap 7.

Figure 1:
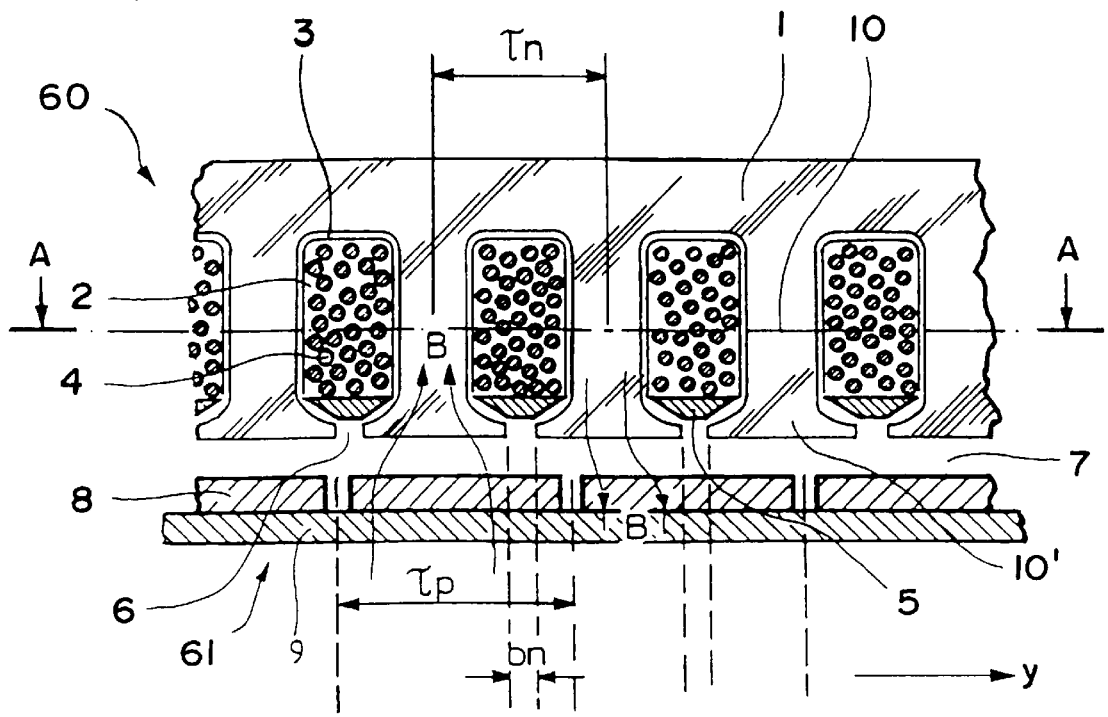
FIG. 1 is a partial section of a linear synchronous motor according to the prior art discussed in the preamble of this description.

In such an embodiment, the teeth 25 have a constant cross-section over their entire height H, since, as will be noted, the flanks of the teeth 25 are parallel and their heads 62 have no tooth shoes as is the case in the prior art motor shown in FIG. 1 (reference 10'). The slots are therefore fully "open" adjacent the inductor 61, as opposed to the slots of the prior art motors which are "half-closed". Further, the width bn of the slots 2 is also substantially equal to the width bd of the tooth heads 62. In other words, and since the sum of the width bd and bn is equal to the tooth pitch $\tau n$, the ratio $bn/\tau n$ is substantially equal to 0.5. "Substantially equal" means here that even when that ratio $bn/\tau n$ is slightly different from the value of 0.5, the performance of a motor in accordance with the invention is still satisfactory. According to experiments carried out on this kind of motor, a ratio $bn/\tau n$ lying between about 0.40 and 0.55 gives efficient results.

Figure 2:
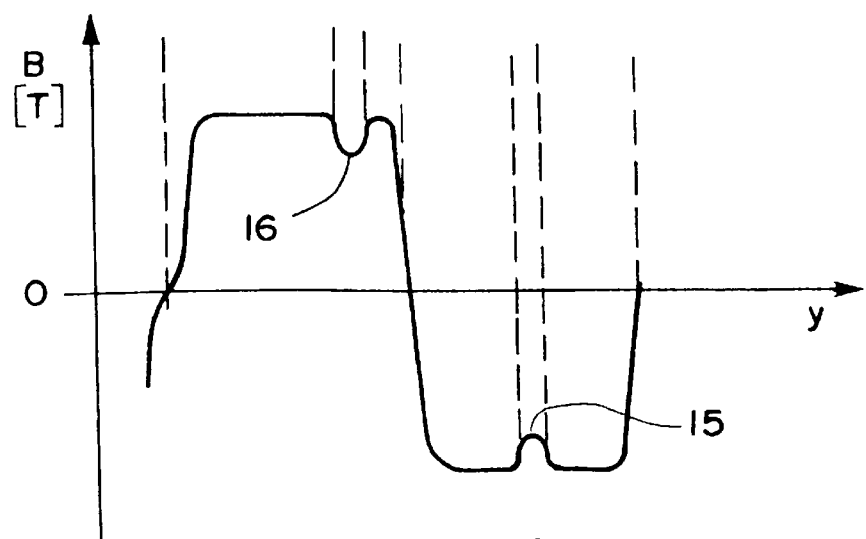
FIG. 2 shows the outline of the magnetic induction B of the FIG. 1 motor.
Figure 1A:
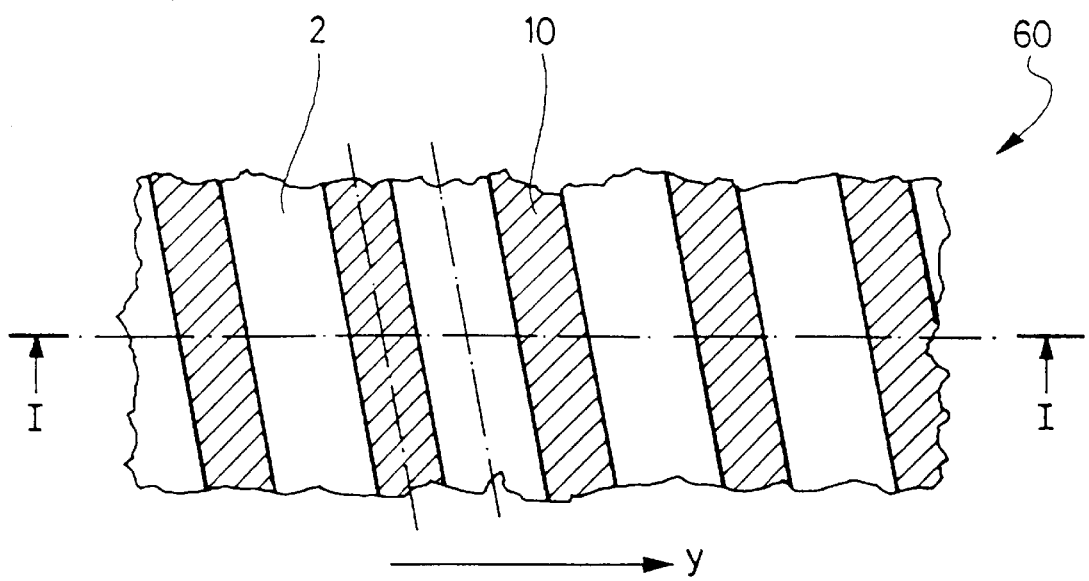
FIG. 1a is a partial section of the FIG. 1 motor, taken along axis A—A of FIG. 1.

If one now considers the outline of the magnetic induction B corresponding to the FIG. 4 motor, FIG. 5 shows that this outline is highly disturbed (references 27 and 28), much more so at any rate than that shown in FIG. 2 for the prior art motor, and this should logically lead to a huge reluctant effect making the motor totally unusable. Now, it will be seen that if the reluctant effect produced by one slot (e.g. if the armature only had a single slot) is actually very large, the reluctant effect produced by several consecutive slots is reduced to a value that is much lower than that found with the prior art motor.

Figure 6:
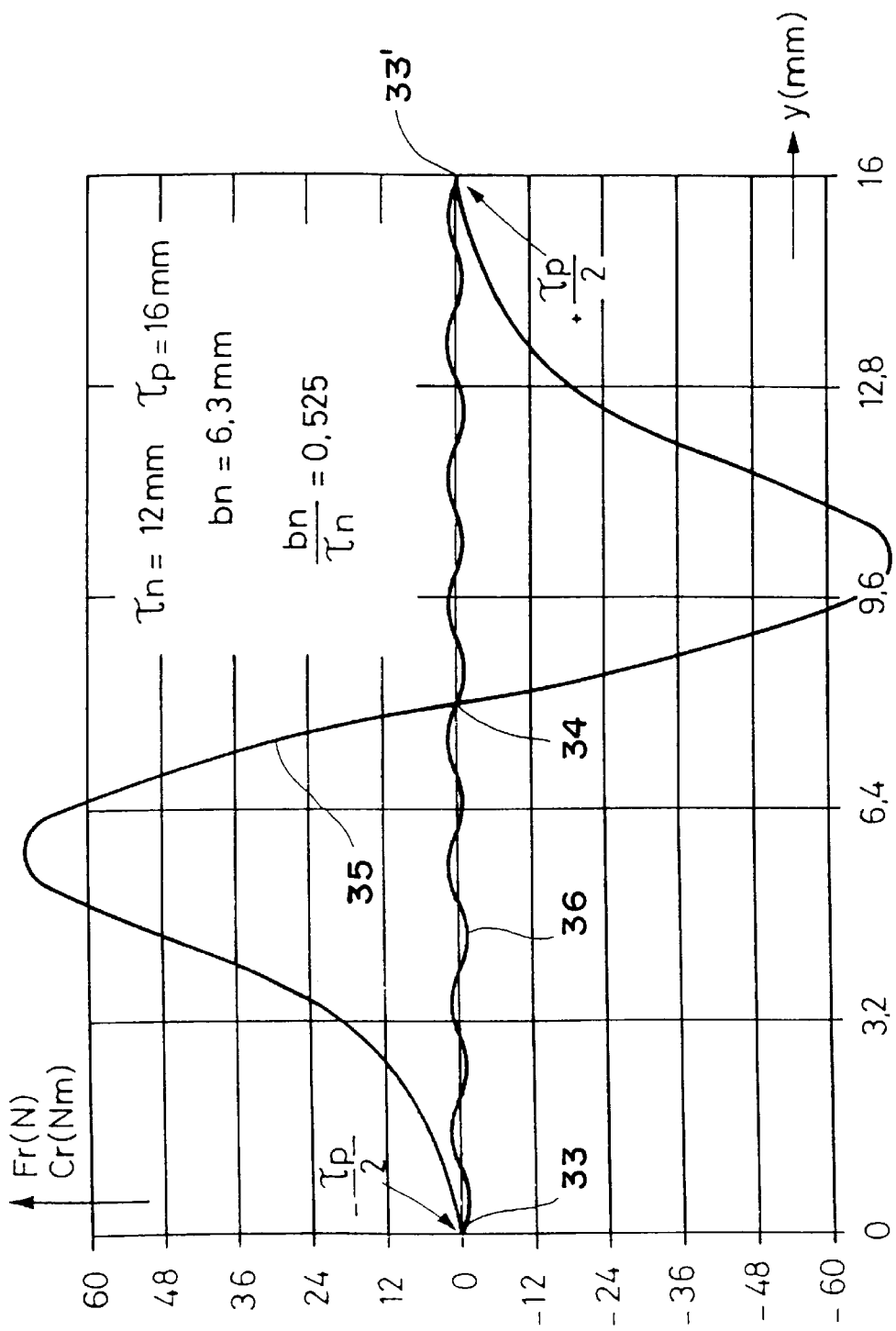
FIG. 6 is a graph representing the reluctant force produced, on the one hand, by a single slot in the FIG. 4 motor, and, on the other hand, by eight slots of the same motor.

This phenomenon is illustrated by the FIG. 6 graph. This graph is based on a motor having a tooth pitch $\tau n$ of 12 mm and a pole pitch $\tau p$ of 16 mm (i.e. identical to those of the above-mentioned prior art motor). But the slot opening bn is here of 6.3 mm, so that the $bn/\tau n$ ratio has a value of 0.525. In the FIG. 6 graph, the pole pitch $\tau p$ in mm is shown on the abscissa and the reluctant force in Newtons is shown on the ordinate. The graph's curve 35 shows the outline of the reluctant force that would be produced if the armature 60 only had one slot, or elementary reluctant force, and which also includes two unstable points 33 and 33' and one stable point 34. This elementary reluctant force has a considerable magnitude, greater than 60 N, as could be anticipated. However, the shape of the curve 35 approaches the one of a sinusoid; this can be attributed to the fact that the slot width bn is substantially equal to the width bd of the tooth head 62. Each slot 2 of the FIG. 4 motor produces an elementary reluctant force having a shape similar to that shown by the curve 35 in FIG. 6, and the curves representing these elementary reluctant forces, which have not been shown, are staggered in relation to one another along axis y because the pole pitch and the tooth pitch have different values.

The overall reluctant force acting in a motor such as the FIG. 4 motor is equal to the sum of the elementary reluctant forces that have just been mentioned. As each of the latter has a shape close to a sinusoid, their sum becomes very small when the values of the pole and tooth pitches are chosen such as to define a minimum common period which has a dimension smaller than the total length of the armature. The reduction of the reluctant effect according to the invention is obtained for a minimum common period. Thus, the armature must have a number of slots which is a multiple integer of the number of slots for said minimum common period. The curve 36 of FIG. 6 represents the overall reluctant force acting in a motor such as that shown in FIG. 4 and which comprises eight slots 2 and six magnets 8. The minimum common period is here equal to 48 mm which corresponds to three pole pitches $\tau p$ and to four tooth pitches $\tau n$. The curve 36 shows that, in this case, the overall reluctant force is about 1 N, whereas for the same type of motor considered in the preamble of the present description, i.e. with pre-slots, this overall reluctant force was in the region of 16 N. One sees here therefore the considerable advantages of the motor made in accordance with the invention, the remarkable feature of the motor being, as already stated, that it is provided with open slots having a width substantially equal to the width of the tooth head.

Figure 7:
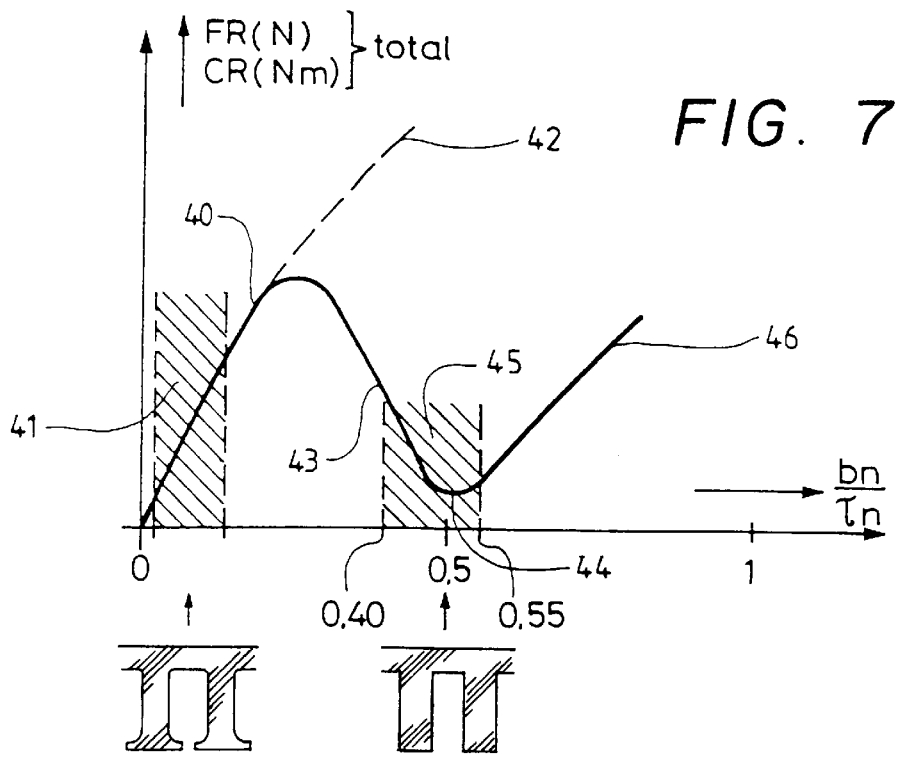
FIG. 7 is a graph representing the evolution of the reluctant force of a synchronous motor according to the invention in dependence on the ratio of slot width to tooth pitch.

The graph of FIG. 7 aptly summarizes all that was said so far. This graph is for a motor having the same pole pitch τp to tooth pitch τn ratio, i.e. for example 16 mm and 12 mm respectively. The ratio bn/τn is shown on the abscissa, tooth pitch τn being kept constant. In other words, slot width bn is caused to increase with respect to tooth pitch τn. The motors considered in accordance with the prior art are situated in the area 41, in which the overall reluctant force Fr increases (portion 40 of the curve) when bn/τn increases. According to a concept that is generally accepted by the man of the art, this overall reluctant force Fr can only continue to increase (portion 42 of the curve) when slot width bn increases. The applicant, however, has found that this force goes through a maximum and then decreases (portion 43 of the curve) to reach a minimum in the area 45 where slot width bn substantially equals half of tooth pitch τn and where are situated the motors according to the invention. From area 45 the global reluctant force Fr increases again in accordance with the portion 46 of the curve.

To summarize, area 41 is that of the prior art motors having semi-closed slots, whereas area 45 is that of the motors having open slots according to the present invention.

It will be appreciated that the reduction of the reluctant effect will be all the better when the number of slots is large. Whereas rotary motors of medium to large size (from 0.1 to 1 m or more) can easily have a large number of slots that enable the reluctant effect to be reduced in remarkable manner, this is more difficult with linear motors whose total length lies for example between 0.1 and 0.5 m and which therefore have a relatively small number of slots.

In the case of linear motors, the armature entry and exit teeth or end teeth can be put to good use to decrease further the reluctant force generated by these end teeth and also the overall reluctant force. The dimensioning of entry and exit teeth has already been discussed in the specialized literature, for example in the thesis No 219 of Nicolas wavre entitled "Etude harmonique tridimensionnelle des moteurs linéaires asynchrones à bobinages polyphasés quelconques" (A tridimentional harmonic study of asynchronous linear motors having polyphase coils of any kind), the Swiss Federal Institute of Technology, Lausanne division, 1975. According to the present invention, the dimensions of the end teeth and the angle of their bevel are so selected as to obtain a reluctant force having a shape and magnitude comparable to those of the reluctant force due to the slots, but of opposite sign. The overall reluctant effect can thus be considerably reduced as this will be described more in detail hereafter with reference to the FIGS. 15 to 20.

The reluctant effect being much smaller in a motor according to the invention than in prior art motor, there is no longer any need to compensate it by resorting to expedients such as those described earlier. Thus, in a motor according to the invention, the laminations forming the armature 60 may be aligned with one another so that, in a cross-section such as that of FIG. 4a, the longitudinal axes of teeth 10 and of slots 2, depicted by chain-dotted lines, may be perpendicular to the direction y of motion of inductor 61, not shown in FIG. 4a, in relation to armature 60. The result of this arrangement is a considerable simplification of the tooling used for assembling the laminations forming armature 60.

Figure 4A:
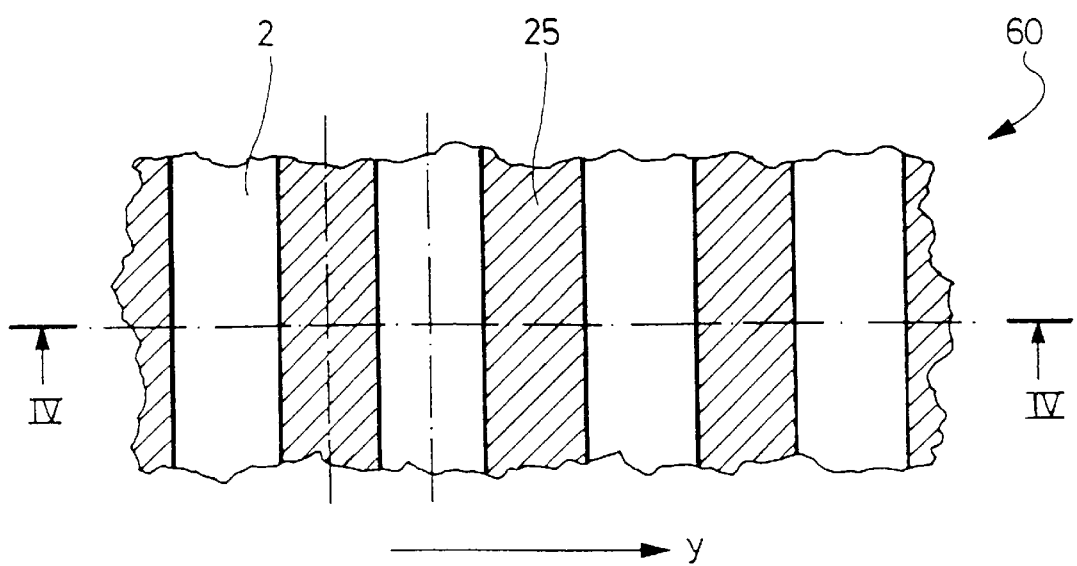
FIG. 4a is a partial section of the FIG. 4 motor taken along axis A—A of FIG. 4.

It should be noted that, in FIG. 4a which is a cross-section made along axis A—A of FIG. 4, the windings 26 have not been shown, and that the laminations forming the armature 60 have not been separately depicted.

Moreover, the magnets 8 may be so arranged that the arises thereof that are parallel to the plane of sole 9 may be parallel and perpendicular respectively to the direction of motion y. This arrangement results in a simplification of the tooling required for assembling the magnets 8 and the sole 9.

Besides the interest in obtaining a very small overall reluctant force Fr, the fact that the teeth 25 of the motor according to the invention have a constant cross-section over their entire height H and have no tooth shoes such as the tooth shoes 10' of the prior art motor shown in FIG. 1 further has the advantage of enabling an ordered and compact spooling of the turns constituting the coils. The turns can thus be contiguous as can be seen from FIG. 4. This makes it possible to achieve a space filling factor for the slots 2 of 60% or possibly more, thereby increasing, on the one hand, the motor's efficiency and, on the other hand, making it much easier for the heat it produces to be dissipated. In the motor according to the invention, each coil only surrounds one tooth so as also to improve efficiency since the length of the winding overhang is thus reduced, thereby diminishing copper loss.

As the teeth 25 are of constant cross-section over their entire height H, the slots 2 are fully open, thereby enabling the preformed coils to be slipped into place. To manufacture those coils, the wires used for the purpose are wound to form contiguous turns on an independent former provided with a rectangular core having a cross-section that is substantially equal to the cross-section of tooth 25. The wire that is used is generally coated with an adhesive which polymerizes when hot. Upon completion of the spooling, a current is made to flow in the wire to heat it and cause the turns to stick to one another. The thus completed coil may be removed from the former and then slipped as a unit over an armature tooth 25.

Figure 9:
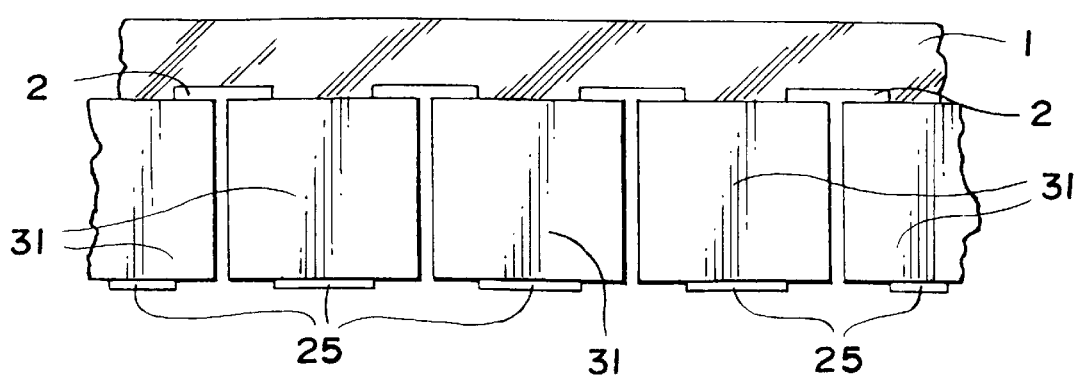

FIGS. 8 and 9 each show the armature 60 of a synchronous motor according to the invention. In the armature 60 of FIG. 8, each coil 30 surrounds a single tooth 25 and occupies substantially the whole of the two slots 2 that are adjacent to the tooth 25 it surrounds. As a result obviously, only one tooth 25 in two is surrounded by a coil 30.

In the armature 60 of FIG. 9, each coil 31 also surrounds a single tooth, but all teeth 25 are surrounded by a coil 31. As a result obviously, two adjacent coils together fill substantially the whole of the slot 2 that separates the two teeth 25 they surround.

FIGS. 10 to 14 are more particularly concerned with the manner of insulating the windings 26 of armature 60 and with the manner of dissipating the heat produced by these windings 26.

FIG. 10 shows an armature 60 fitted with windings 26 inserted into the slots 2 in accordance with the method described earlier. The Figure shows that at the bottom of slot 2, between the yoke 1 and the winding 26, there is a tube 11 in which circulates a cooling liquid 50. This cooling system enables the heat produced by the winding 26 to be rapidly transmitted to the exterior. It will be noted that, since the slots 2 are straight and open, the tubes 11 may be prepared ahead of time with folds at the ends (not shown) to form a kind of coil. It will be appreciated that if this kind of cooler were applied to the prior art (FIG. 1), the tubes 11 would have to be connected to one another after being inserted into the slots 2 since the narrow pre-slot 6 would not enable the tubes 11 to get through, thereby appreciatively complicating the assembly of the motor. FIG. 10 also shows an insulating sheet 3 disposed between the winding 26 and the tooth 25, which can very easily be inserted into the slot 2 since that latter is open.

FIG. 11 shows an arrangement very similar to that of FIG. 10, again with the cooling tube 11 and the insulating sheet 3. In addition, FIG. 11 shows that the tube 11 is at least partly surrounded by a sheet 12, shown in perspective in FIG. 12, this sheet being moreover sandwiched between the tooth 25 and the winding 26 and extending to the head 62 of tooth 25. The sheet 12 serves as a heat transfer means between the winding 26 and the cooling tube 11. This sheet is made of a heat conductive material, such as copper or aluminium, or of a composite material, e.g. carbon fibre. If the sheet is made of aluminium, the latter may be oxidized. This makes it possible to do away with the insulating sheet 3 and hence reduce heat resistance still further.

It will however be observed that if the sheet 12 is metallic, and hence electrically conductive, the leakage flux of slots 2 will induce eddy currents therein. In all synchronous motors having relatively deep slots, slot leakage inductance may become the main inductance, which generally is a drawback. One way of reducing slot leakage inductance is in fact to use the heat transfer sheet 12 also as a shield against the slot leakage flux. If this shield becomes excessive, its effect may be adjusted by machining slots 13, such as shown in FIG. 12. These slots 13, like the laminations of electric motors, reduce the magnitude of the eddy currents. These eddy currents can be eliminated by a large number of slots without notably reducing the heat transfer capacity. It should be noted that, for the sheet 12, use may be made of an alloy providing a good compromise between its heat conductivity and its electrical conductivity.

FIGS. 13 and 14 depict a modification of the arrangement shown in FIGS. 11 and 12. The cooling system 14 of FIGS. 13 and 14 combines into a single part the conductive sheet 12 and the cooling tube 11 of FIGS. 11 and 12. This system 14 may for instance be made of an aluminium extruded member.

The arrangement of the two end teeth of the armature according to the present invention will be described more particularly hereinafter with the aid of FIGS. 15 to 20.

FIG. 15 shows a linear motor given to better describe the very advantageous effect of the present invention as regards the end teeth. The armature 70, formed of a pack of ferromagnetic laminations, defines slots 2 and a plurality of teeth 25 similar to the embodiment described in FIG. 4. Likewise, the arrangement of the permanent magnets 8 on inductor 61, in particular the pole pitch τp with respect to the tooth pitch τn, is similar to that described within the framework of previous embodiments of the invention. The armature 70 has here two end teeth 72 and 74 having an identical profile to the plurality of teeth 25 situated between such two end teeth 72 and 74. The arrangement of the armature 70, although allowing the reluctant effect due to the slots 2 to be favourably reduced, as has been described previously, generates a relatively significant end reluctant effect which is detrimental to the functioning of such a linear motor.

Figure 16:
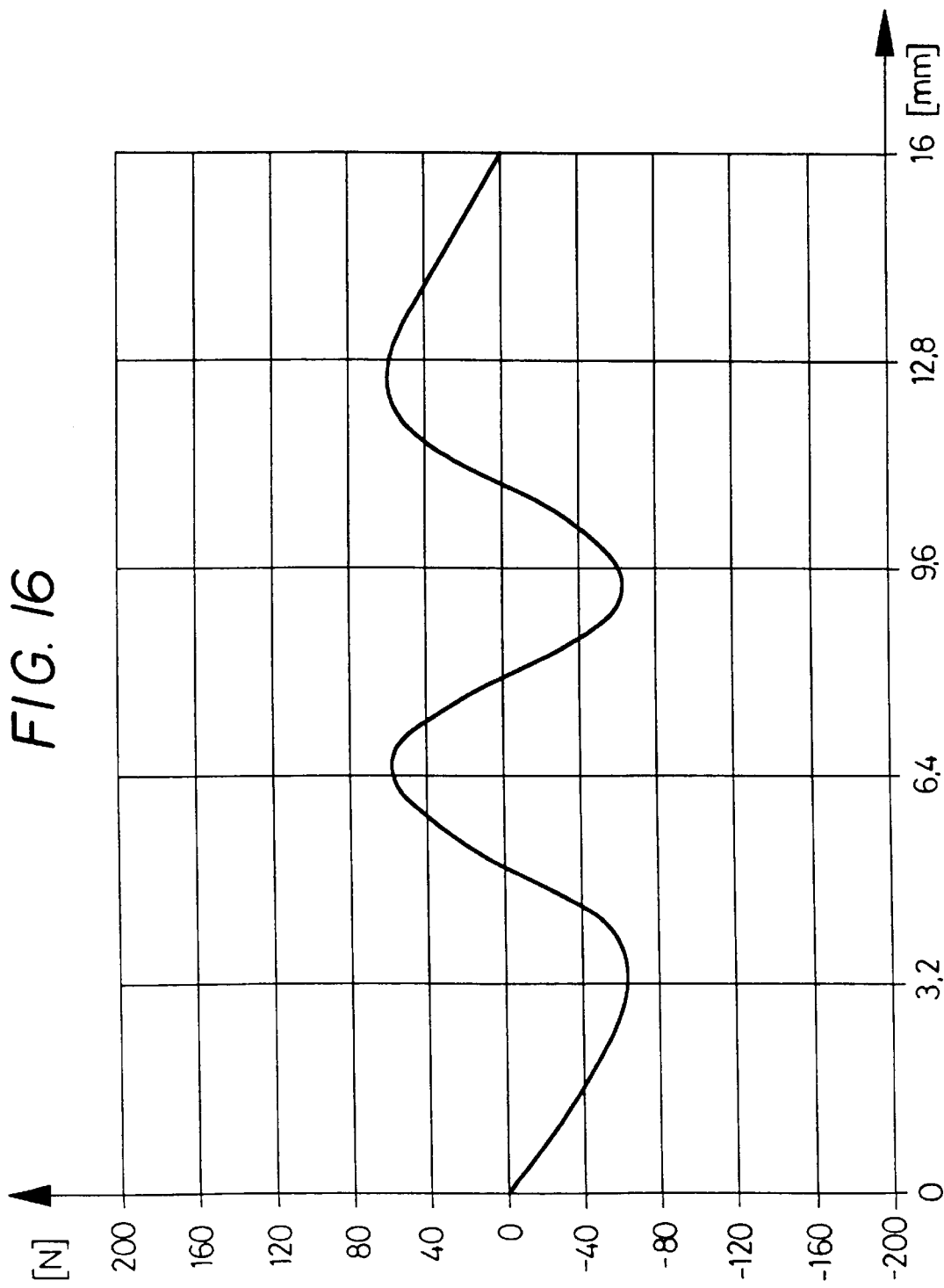
FIG. 16 shows the reluctant force generated by the two end teeth shown in FIG. 15, in the most favourable case for given dimensions.

FIG. 16 shows the total reluctant effect of the end teeth 72 and 74, in an embodiment with a pole pitch τp=16 mm, the end teeth 72 and 74 having a rectangular profile. However, it has been noted that the variation in the parasitic reluctant force on one pole pitch is approximately 120 N. This variation is enormous and does not allow proper functioning of the linear motor. Thus, it is to be noted that an embodiment according to FIG. 15 is not entirely satisfactory.

Figure 17:
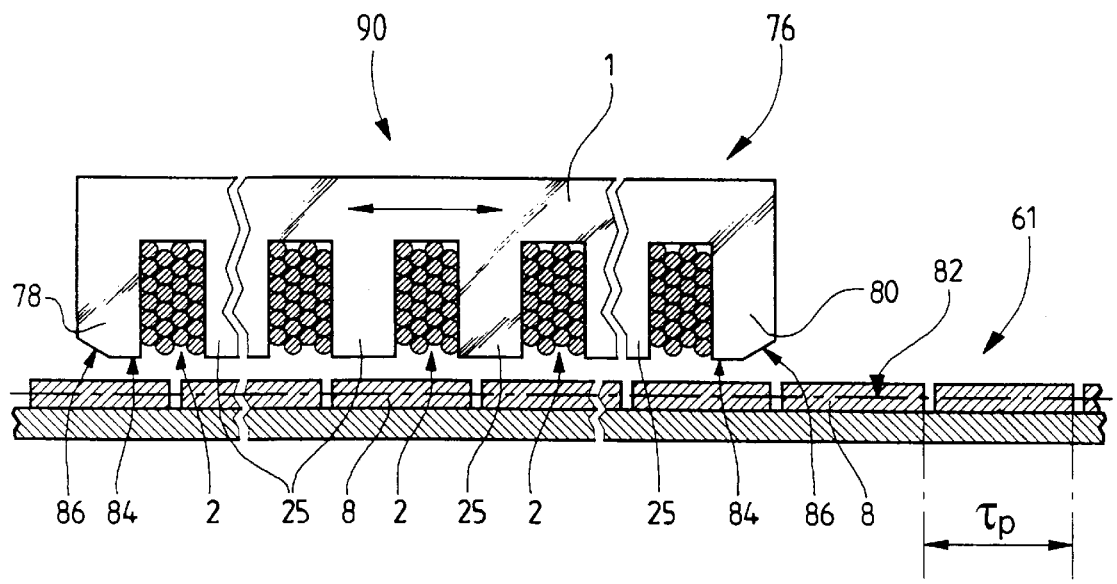
FIG. 17 shows schematically a fifth embodiment of the linear motor according to the invention for which the end reluctant effect is greatly reduced.
Figure 18:
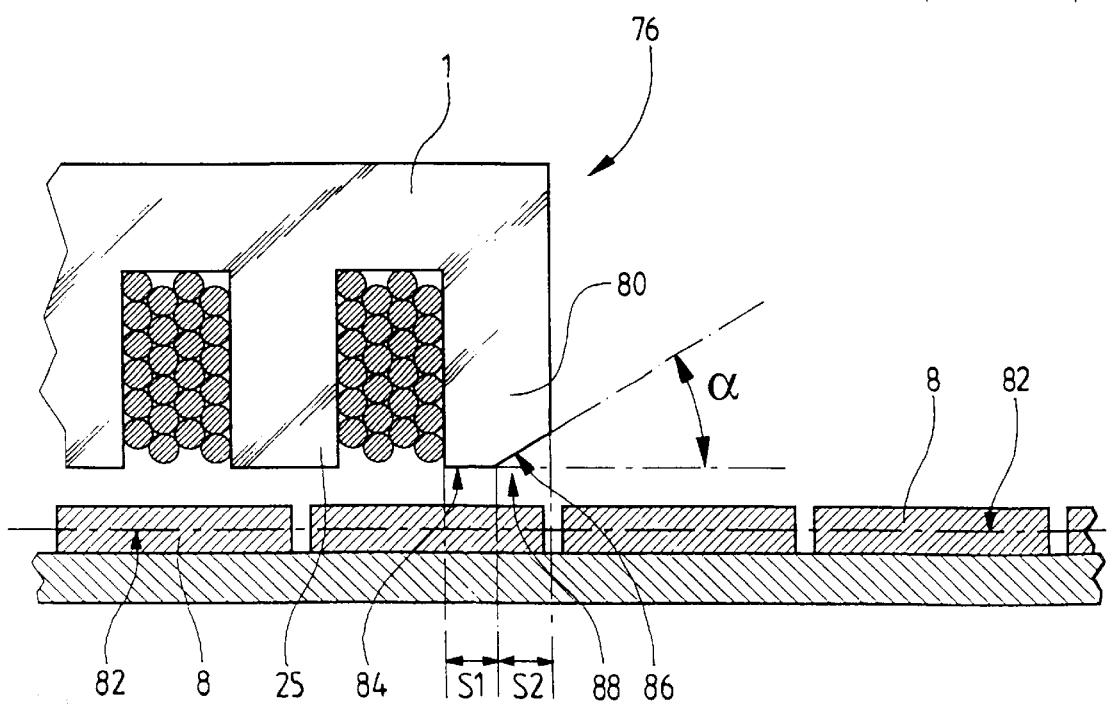
FIG. 18 is a partial enlargement of FIG. 17.

FIG. 17 shows an embodiment of the invention with an armature 76 which has a substantially lower end reluctant effect with respect to the embodiment of FIG. 15. FIG. 18 is a partial enlarged view of FIG. 17.

The armature 76 comprises a pack of ferromagnetic laminations forming a yoke and a plurality of teeth 25 situated between two end teeth 78 and 80 which are also formed by said pack of laminations. Each of the two end teeth 78 and 80 has a profile, in the cross-section plane of FIGS. 17 and 18 corresponding to a longitudinal cross-section plane of the armature 76 which is perpendicular to the general plane 82 defined by the permanent magnets 8 of the inductor 61, formed of a longitudinal segment 84 defining a substantially constant air-gap with the general plane 82 and of a segment 86 defining an air-gap 88 which increases in the direction moving away from the central part 90 of the armature 76. "Longitudinal" here means a direction or a dimension parallel to the relative direction of movement between the armature 76 and the inductor 61.

Conversely, the longitudinal axes of the plurality of teeth 25 and of the two end teeth 78 and 80 are perpendicular to the relative direction of movement between the armature 76 and the inductor 61. Thus, all the laminations of the pack of laminations forming the armature 76 have an essentially identical profile, which facilitates the manufacturing of such laminations and also the assembly thereof. The linear motor according to the present embodiment is thus of relatively easy and inexpensive construction. Moreover, no fine adjustment is necessary when the armature 76 is assembled.

The segment 84 defines a longitudinal line segment while the segment 86 defines a sloping line segment forming an external sloping edge of the armature 76. The directions defined respectively by the segments 84 and 86 are staggered at an angle $\alpha$ of between 15° and 35° to obtain a significant reduction of the parasitic reluctant force due to the two end teeth 78 and 80. In a preferred embodiment, the length S1 of the segment 84 is comprised within the range of 0.3 τp and 0.5 τp, while the length S2 of the segment 86 projecting into the general plane 82 is comprised within the range of 0.2 τp and 0.45 τp.

FIG. 19 shows the curve of the total reluctant force due to the two end teeth 78 and 80 of the linear motor shown in FIGS. 17 and 18 with a pole pitch τp=16 mm, a length S1=6 mm, a length S2=5 mm, an angle $\alpha$=20° and an arrangement of the end teeth 78 and 80 such that they are magnetically phase shifted as a function of the pole pitch τp in such a way that the respective reluctant effects of the two end teeth 78 and 80 compensate each other so that the sum thereof is minimal. As is seen clearly from the graph of FIG. 19 established by the inventor, the variation in parasitic reluctant force due to the two end teeth is greatly reduced with respect to the case of FIG. 16, such variation being less than 30 N.

Furthermore, it has been noted within the framework of research subjacent to the present invention that it is possible to arrange the plurality of teeth 25 and the slots 2, and the two end teeth 78 and 80 so as to phase shift the reluctant effect due to the end teeth and the reluctant effect due to the slots of the armature 76. By correctly selecting the various parameters affecting the arrangement of the armature 76, in particular the width of the teeth and the slots, the values of lengths S1 and S2 and the angle $\alpha$, it is possible to reduce the total reluctant effect of the linear motor so that this total reluctant effect is less than the minimum reluctant effect of the two end teeth and also less than the minimum reluctant effect of all the slots of the armature. With the aid of the teaching given in the present description, the man skilled in the art is able to select for each of the motors which he constructs, the optimum values of these parameters in order to obtain a quasi zero total reluctant effect. As is seen clearly from the graph of FIG. 20 established by the inventor, the total reluctant effect of the linear motor, according to the embodiment described with the aid of FIGS. 17 to 19, is greatly reduced, the variation in the residual parasitic reluctant force being less than 10 Newtons. The linear motor according to the invention which has just been described constitutes an appreciable technological advance in the field of permanent magnet synchronous linear motors.

What is claimed is:

1. A synchronous linear motor comprising:

an inductor comprising a plurality of permanent magnets arranged in a regular manner with a determined pole pitch τp on a flux-returning sole, said permanent magnets defining a general plane of the linear motor;

an armature, facing said inductor, formed by a pack of ferromagnetic laminations forming a yoke;

a plurality of teeth formed by said ferromagnetic laminations, having a tooth pitch τn, forming at their free ends heads having substantially identical first widths, and forming slots between said teeth having substantially identical second widths between said heads, the sum of said first and said second widths defining said tooth pitch τn;

a plurality of coils disposed in said slots so that each of them surrounds one tooth of said plurality of teeth;

first and second end teeth on each end of said plurality of teeth and defining two additional slots each having substantially said identical second width, the first and second teeth each having a head profile with a first surface part, adjacent said plurality of teeth and forming a substantially constant gap with respect to said general plane, and a second surface part adjacent said first surface part and defining a gap with said general plane which increases in the direction away from said plurality of teeth;

said second width to said tooth pitch τn having a ratio wherein the reluctant effect of all the slots is essentially less than the reluctant effect of any one of the slots;

said first and second end teeth being magnetically phase shifted to reduce the reluctant effect of said first and second end teeth to less than the individual reluctant effect of the first or second end tooth, said surface profile of said first and second end teeth and said first and second widths defined by said plurality of teeth reducing the total reluctant effect of the linear motor to less than said reluctant effect of the first and second end teeth and less than said reluctant effect of all of the slots.

2. A linear motor as in claim 1, wherein said plurality of teeth and the first and second end teeth have longitudinal axes perpendicular to the direction of relative movement between said armature and said inductor.

3. A linear motor as in claim 2, wherein said second surface part slopes with respect to said first surface part so that said first and second end teeth each have an external sloping edge.

4. A linear motor as in claim 3, wherein said first surface part has a length comprised within the range of 0.3 τp and 0.5 τp, and said sloping second part has a length, when projected in said general plane, comprised within the range of 0.2 τp and 0.45 τp.

5. A linear motor as in claim 4, wherein the first surface part and said second surface part define between them an angle within the range of 15° and 35°.

6. A linear motor as in claim 1, wherein said second surface part is a sloping surface with respect to said first surface part so that said first and second end teeth each have an external sloping edge.

7. A linear motor as in claim 1, wherein said teeth of said plurality of teeth each define two substantially parallel flanks so that their cross-section is substantially constant over their entire height.

8. A linear motor as in claim 7, wherein each coil surrounds one tooth of said plurality of teeth and substantially fills all of the two slots adjacent the tooth it surrounds, only one tooth in two being surrounded by one of said coils.

9. A linear motor as in claim 7, wherein each tooth of said plurality of teeth is surrounded by one of said coils, two adjacent coils together filling substantially all of the slot separating the two adjacent teeth which they surround.

10. A synchronous linear motor as in claim 7, wherein said ratio of said second width to said tooth pitch being within the range of approximately 0.40 and 0.55.

11. A synchronous linear motor as in claim 1, wherein the laminations of said pack of laminations have essentially identical profiles.

12. A synchronous motor as in claim 1 wherein said slots have a substantially constant width.

* * * * *